US008304693B2

(12) United States Patent
Ma

(10) Patent No.: US 8,304,693 B2
(45) Date of Patent: Nov. 6, 2012

(54) REFRACTORY MATERIALS REINFORCED COMPOSITES FOR THE GMAW CONTACT TIPS

(75) Inventor: Tiejun Ma, Tecumseh (CA)

(73) Assignee: Illinois Tool Works Inc., Glenview, IL (US)

(*) Notice: Subject to any disclaimer, the term of this patent is extended or adjusted under 35 U.S.C. 154(b) by 299 days.

(21) Appl. No.: 12/776,509

(22) Filed: May 10, 2010

(65) Prior Publication Data
US 2011/0006048 A1 Jan. 13, 2011

Related U.S. Application Data

(60) Provisional application No. 61/225,070, filed on Jul. 13, 2009.

(51) Int. Cl.
*B23K 9/28* (2006.01)
(52) U.S. Cl. ...... 219/137.61; 219/137 MW; 219/137.42
(58) Field of Classification Search ............ 219/137.61, 219/137.42, 137 WM
See application file for complete search history.

(56) References Cited

U.S. PATENT DOCUMENTS

| 3,107,418 | A | | 10/1963 | Gorman | |
|---|---|---|---|---|---|
| 3,366,774 | A | | 1/1968 | Nuss et al. | |
| 3,676,640 | A | * | 7/1972 | Bernard et al. | 219/137.52 |
| 3,836,747 | A | * | 9/1974 | Wlos | 219/137.61 |
| 4,225,772 | A | * | 9/1980 | Bacha | 219/137.62 |
| 4,283,616 | A | * | 8/1981 | Bacha | 219/76.14 |
| 4,450,341 | A | | 5/1984 | Dietrick et al. | |
| 4,560,858 | A | | 12/1985 | Manning | |
| 4,937,428 | A | | 6/1990 | Yoshinaka et al. | |
| 4,988,846 | A | | 1/1991 | Karlsten et al. | |
| 5,556,562 | A | | 9/1996 | Sorenson | |
| 5,635,091 | A | * | 6/1997 | Hori et al. | 219/137.61 |
| 5,760,373 | A | * | 6/1998 | Colling | 219/137.61 |
| 5,911,894 | A | * | 6/1999 | Colling | 219/137.61 |
| 6,075,227 | A | * | 6/2000 | Lajoie | 219/137.61 |
| 6,093,907 | A | * | 7/2000 | Hidaka | 219/137.61 |
| 6,307,179 | B1 | * | 10/2001 | Walters, III | 219/137.42 |

(Continued)

FOREIGN PATENT DOCUMENTS
DE 3330335 3/1985
(Continued)

OTHER PUBLICATIONS

Mohler, W. et al., "Contact tubes with improved characteristics—made of extruded composite materials," Welding & Cutting, pp. 214-216, vol. 53, No. 9, 2001.

(Continued)

*Primary Examiner* — Viet Q Nguyen
(74) *Attorney, Agent, or Firm* — Fildes & Outland, P.C.

(57) ABSTRACT

A contact tip for a welding torch includes a refractory material reinforced copper composite including approximately 10 to 50% by volume of a refractory material and at least one of copper and a copper alloy. The refractory material is one of a metal and a ceramic material. The contact tip may include an elongated, generally cylindrical body having a front contact end, an opposite rear retaining end, and a passageway extending from the rear retaining end to the front contact end. A portion of the passageway may be defined by the refractory material reinforced copper composite. The portion may have a diameter that is approximately 3 to 8% larger than an outer diameter of a consumable electrode wire, and the portion may have a length of approximately 0.2 to 0.6 inches.

16 Claims, 3 Drawing Sheets

U.S. PATENT DOCUMENTS

| | | | |
|---|---|---|---|
| 6,444,950 B1 * | 9/2002 | Altekruse et al. | 219/137.42 |
| 6,649,858 B2 * | 11/2003 | Wakeman | 219/73.2 |
| 6,689,987 B2 * | 2/2004 | Altekruse et al. | 219/137.61 |
| 6,710,300 B2 | 3/2004 | Steenis et al. | |
| 6,847,009 B2 * | 1/2005 | Stuart et al. | 219/137.61 |
| 6,943,318 B2 | 9/2005 | Takagi et al. | |
| 7,176,412 B2 * | 2/2007 | Wells | 219/137.61 |
| 7,271,366 B2 * | 9/2007 | Kensrue | 219/137.61 |
| 7,381,923 B2 * | 6/2008 | Gordon et al. | 219/137.61 |
| 7,423,235 B2 * | 9/2008 | Severance, Jr. | 219/121.59 |
| 7,576,300 B2 * | 8/2009 | Giese | 219/137.61 |
| 2005/0230373 A1 | 10/2005 | Kensrue | |
| 2008/0035623 A1 | 2/2008 | Hutchison | |
| 2008/0061050 A1 * | 3/2008 | Walters | 219/137.61 |
| 2008/0314876 A1 | 12/2008 | Pinsonneault et al. | |
| 2009/0152255 A1 * | 6/2009 | Ma et al. | 219/137.61 |

FOREIGN PATENT DOCUMENTS

| | | | |
|---|---|---|---|
| JP | 5218445 | | 2/1977 |
| JP | 52018445 | * | 12/1977 |
| JP | 52018446 | * | 12/1977 |
| JP | 6000650 | | 1/1994 |
| WO | 9965635 | | 12/1999 |
| WO | 2008110131 | | 9/2008 |

OTHER PUBLICATIONS

Holm, R., "Electrical contacts, Theory and applications," pp. 87-92, 4th ed., Springer, 2000.

Luijendijk, T. et al., "Calculation of the electrical resistance between contact tube and welding wire during GMA welding based on measurement of the contact force," Int. J. for the Joining of Materials, pp. 1-4, vol. 8(1), 1996.

Thier, H. et al., "Current contact tip life—Evaluation for different contact tip materials and shapes," Welding and Cutting, pp. 22-27, vol. 46, No. 5, 1995.

Shimizu, H. et al, "Wear mechanism in contact tube," Science and Technology of Welding and Joining, pp. 94-105, vol. 11, No. 1, 2006.

* cited by examiner

REFRACTORY MATERIALS REINFORCED COMPOSITES FOR THE GMAW CONTACT TIPS

CROSS REFERENCE TO RELATED APPLICATION

This application claims the priority of U.S. Provisional Application No. 61/225,070 filed Jul. 13, 2009.

TECHNICAL FIELD

This invention relates to contact tips for a GMAW (gas metal arc welding), MIG (metal inert gas), MAG (metal active gas), SAW (submerged arc welding), or FCAW (flux cored arc welding) welding torch, and more particularly to materials of construction of a contact tip.

BACKGROUND OF THE INVENTION

A conventional welding torch 10 illustrated in FIG. 1 generally includes a cable assembly connected to a torch body including a handle 11, a neck such as a gooseneck 12 extending from the handle, and a torch head at a distal end of the gooseneck. The torch head typically includes a retaining head and/or diffuser 13, a contact tip 14, and a nozzle 15. Welding wire (consumable electrode) and shielding gas are fed through the cable assembly and gooseneck to the torch head, where the welding wire and shielding gas are fed out of the contact tip and nozzle.

Common metal welding techniques employ heat generated by electrical arcing to transition a portion of a workpiece to a molten state and to add filler metal from the welding wire. Energy (e.g., welding current) is transferred from the cable assembly and gooseneck through the front components of the torch including the retaining head and contact tip, to the consumable electrode welding wire. When a trigger on the welding torch is operated (or an "on" signal is assigned by a robot/automatic controller in the case that the torch is used in a robotic system), electrode wire is advanced toward the contact tip, at which point current is conducted from the contact tip into the exiting welding wire. A current arc forms between the electrode wire and the workpiece, completing a circuit and generating sufficient heat to melt the electrode wire to weld the workpiece. The shielding gas helps generate the arc and protects the weld. As the electrode wire is consumed and becomes a part of the weld, new electrode wire is advanced, continuously replacing the consumed electrode wire and maintaining the welding arc.

In order to increase welding speeds (e.g., the travelling speed) and to reduce spatter generation in welding applications, welding power sources have recently been utilizing modern waveforms that are represented by pulse and controlled short circuit. These waveforms typically use high peak current (I_Peak) in a short pulse period and high current ramp rate.

The high welding current and high current ramp rate transferring across the contact tip—electrode wire interface during pulse welding applications causes local melt or evaporation (e.g., arc erosion) on both the electrode wire and the contact tip. For example, burn marks form on the electrode wire as it is fed through the contact tip. This pattern of burn marks on the electrode wire is a characteristic feature of modern pulse waveform welding and is not seen on electrode wire fed through contact tips during constant voltage welding modes. Arc erosion during pulse welding applications causes substantial wear removal of the contact tip, and practical data indicates that contact tips deteriorate faster in pulse welding applications in comparison to constant voltage applications.

As a contact tip is used and deteriorated, the energy transfer efficiency between the contact tip and the electrode wire decreases. This results in lower energy consumption at the arc. When the energy consumption is too low to maintain a smooth welding arc, stubbing occurs, which causes undesired welding defects such as cold welding and discontinuous beads.

One method that has been used to reduce arc erosion in pulse welding applications is to increase the mechanical contact force between the contact tip and the electrode wire. The electrical resistance at the contact point decreases as the contact force increases. Thus, less heat is generated and consumed at the contact tip—electrode wire interface, and there is less chance of arc erosion such as micro-sparkling, local melting, and local evaporation. Various contact tip and welding torch designs have been proposed to improve the mechanical contact between the contact tip and electrode wire. However, these designs are either too expensive to be commercialized, or too fragile to tolerate the harsh nature of the welding environment, such as spatter.

SUMMARY OF THE INVENTION

The present invention provides a group of refractory material reinforced copper composites that form at least part of a welding torch contact tip. During welding, the refractory material(s) in the contact tip either consume a large amount of heat when "burned off" by micro-arcing and/or remain in a solid state at the high welding temperatures to protect the matrix copper or copper alloy of the contact tip from being burned off or adhered to the electrode welding wire. The refractory material(s) thereby reduce contact tip wear. The solid state of the refractory material(s) also reduces feeding friction force of the electrode wire inside the contact tip at elevated temperatures by reducing the level of adherence of the electrode wire to the contact tip. Thus, the gap between the inner diameter of the contact tip including the present refractory material(s) and the outer diameter of the electrode wire may be made tighter (smaller) than in conventional contact tips. More specifically, at least a portion of the inner bore may have an inner diameter that is approximately 3.0 to 8.0% larger than the outer diameter of the electrode wire, and this portion may have a length that is approximately 0.20 to 0.60 inches in length. The present contact tip is also more tolerant of electrode wires having large deviations in outer diameter or large deviations in curvature (i.e., wire cast).

More particularly, a contact tip for a welding torch in accordance with the present invention includes a refractory material reinforced copper composite including approximately 10 to 50% by volume of a refractory material and at least one of copper and a copper alloy. The refractory material is one of a metal and a ceramic material.

The refractory material may be at least one of tungsten (W), molybdenum (Mo), graphite, tungsten carbide (WC), zirconium oxide (ZrO$_2$), silicone carbide (SiC), magnesium oxide (MgO), and alumina (Al$_2$O$_3$). The refractory material may have a structure including one or more of whiskers, continuous fibers, short fibers, particles, laminar flakes, and porous pre-form structures.

In one embodiment, the refractory material may be tungsten (W), and the refractory material may be present in a range of 10 to 41% by volume, preferably in a range of 10 to 32% by volume.

The electrical conductivity of the refractory material reinforced copper composite may be generally between $2.61 \times 10^7$ and $5.22 \times 10^7$ Siemens per meter at 20° C.

The contact tip may be partially formed of the refractory material reinforced copper composite. Alternatively, the contact tip may be entirely formed of the refractory material reinforced copper composite. The contact tip may include a body made of at least one of a copper and a copper alloy, and the body may be impregnated with the refractory material reinforced copper composite.

In one embodiment, the contact tip may include a body having a front discharge end, an opposite rear feed end, and a bore extending through the body. An insert may be received in the bore through one of the front discharge end and the rear feed end, and the insert may include the refractory material reinforced copper composite.

In another embodiment, the contact tip may include a body having a front discharge end, an opposite rear feed end, and a passageway extending from the rear feed end to the front discharge end. A portion of the passageway may be defined by the refractory material reinforced copper composite. The portion may have a diameter that is approximately 3 to 8% larger than an outer diameter of a consumable electrode wire, and the portion may have a length of approximately 0.2 to 0.6 inches.

A welding torch assembly in accordance with the present invention includes a retaining head and a contact tip mounted in the retaining head. The contact tip includes a refractory material reinforced copper composite including approximately 10 to 50% by volume of a refractory material and at least one of copper and a copper alloy. The refractory material is one of a metal and a ceramic material. The refractory material may be at least one of tungsten (W), molybdenum (Mo), graphite, tungsten carbide (WC), zirconium oxide ($ZrO_2$), silicone carbide (SiC), magnesium oxide (MgO), and alumina ($Al_2O_3$). The electrical conductivity of the refractory material reinforced copper composite may be generally between $2.61 \times 10^7$ and $5.22 \times 10^7$ Siemens per meter at 20° C.

These and other features and advantages of the invention will be more fully understood from the following detailed description of the invention taken together with the accompanying drawings.

DETAILED DESCRIPTION OF THE INVENTION

Figure 2:
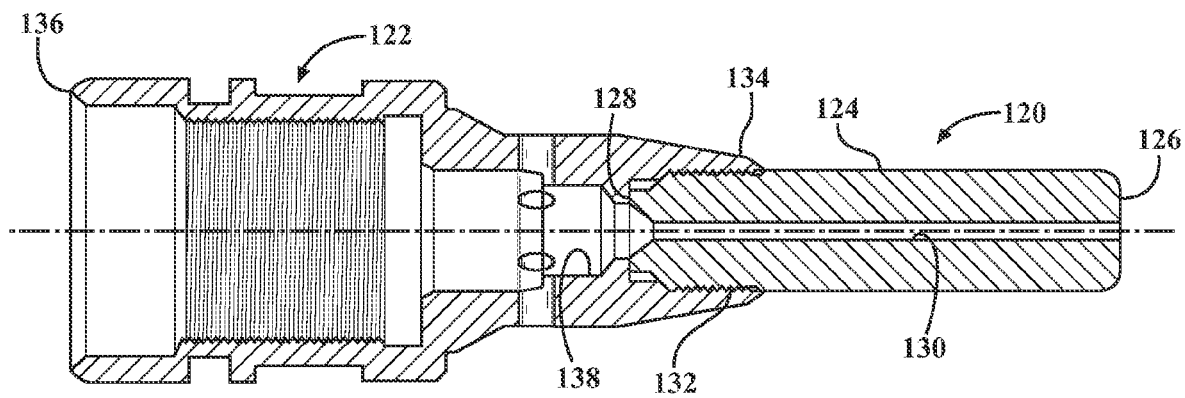
FIG. 2 is a sectional view of a contact tip including a refractory material reinforced copper composite in accordance with the present invention.

Referring now to the drawings in detail, numeral 120 in FIG. 2 generally indicates a welding torch contact tip in accordance with the present invention. The contact tip 120, which is a consumable/replaceable component of the welding torch, has a significantly greater useful life in comparison to conventional contact tips.

Figure 1:
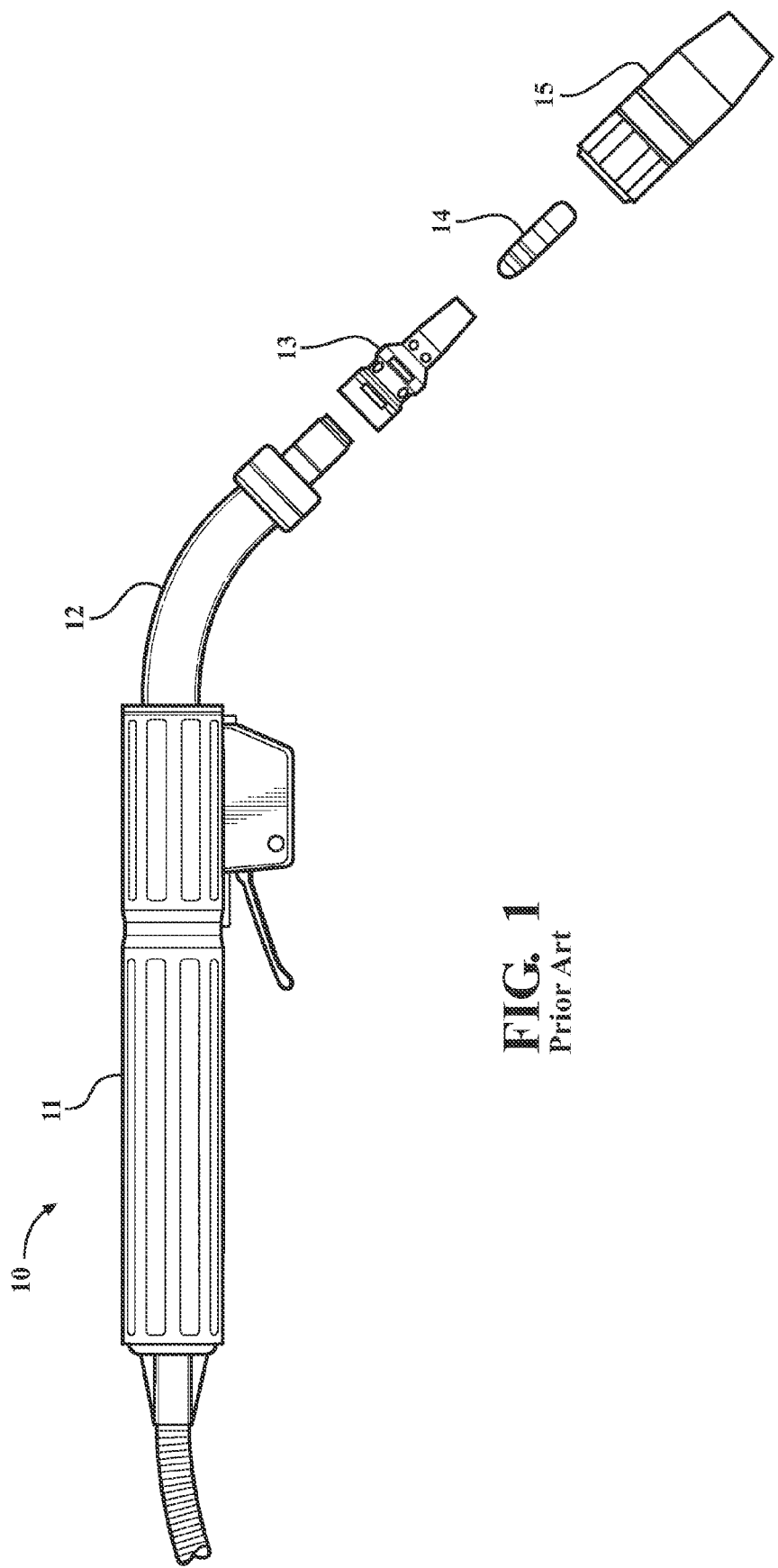
FIG. 1 is a perspective, partially exploded view of a conventional welding torch.

With reference to FIG. 2, the contact tip 120 is mountable in a retaining head/diffuser 122 of a welding torch such as the GMAW torch shown in FIG. 1, a MIG torch, a MAG torch, a SAW torch, a FCAW torch, or similar welding torch. The contact tip 120 has a body 124 that may be elongated and generally cylindrical, although the body is not limited to any specific shape. The body 124 has a front discharge end 126 having an opening from which electrode wire exits and an opposite rear feed end 128 having an opening into which the electrode wire is fed. A central bore 130 defined by an inner wall of the body extends through the body from the opening at the rear end 128 to the opening at the front end 126.

The contact tip 120 is mounted and secured in the retaining head 122. For example, the contact tip 120 may include a mounting feature 132 such as threads that cooperate with a related feature in the retaining head 122 for mounting and securing the contact tip in the retaining head. Alternative means for mounting the contact tip in the retaining head 122 exist; however, the contact tip 120 should be detachable from the retaining head 122 so that the contact tip, as a consumable, can be changed when worn.

The retaining head 122 is generally hollow and has a front end 134, an opposite rear end 136, and an aperture 138 extending from the front end 134 to the rear end 136. The contact tip 120 is securely retained at the front end 134 of the retaining head 122. The aperture 138 in the retaining head is continuous with the bore 130 through the contact tip body 124, and the contact tip 120 and retaining head 122 together define a passageway for a consumable electrode welding wire and welding current from the gooseneck of the torch to a front, welding end of the torch.

The body 124 of the contact tip 120 may be partially or entirely formed of a refractory material reinforced copper composite. The refractory material reinforced copper composite is a composite material generally including a copper matrix material and 10 to 50 percent by volume of a refractory material(s) as its primary or sole constituents. The total content of refractory material(s) in the composite generally should be at least 10% by volume, otherwise the composite may not have enough resistance to adhesion and arc-erosion. The total content of refractory material(s) in the composite generally should be no greater than 50% by volume, otherwise the electrical conductivity of the composite may be too low to effectively carry and transfer welding current to a consumable electrode wire travelling through the contact tip 120. The electrical conductivity of the refractory material reinforced copper composite is generally between $2.61 \times 10^7$ and $5.22 \times 10^7$ Siemens per meter, i.e., between 45 and 90% IACS (International Annealed Copper Standard) at 20° C., wherein an IACS value of 100% refers to a conductivity of $5.80 \times 10^7$ Siemens per meter at 20° C.

The copper matrix material of the refractory material reinforced copper composite is generally copper and/or a copper alloy, and may include one or more of wrought or cast pure copper ($\cong$99.3% Cu), tellurium copper (C14500), chromium copper (C18200 or C81500), silver copper (C11300, C11400, C11600), or similarly suitable copper alloy.

The refractory material(s) of the composite include refractory metals and refractory ceramics, and may include one or more of tungsten (W), molybdenum (Mo), graphite, tungsten carbide (WC), zirconium oxide ($ZrO_2$), silicone carbide (SiC), magnesium oxide (MgO), and alumina ($Al_2O_3$). As shown in the following table, the refractory materials have significantly higher melting and vaporization temperatures in comparison to copper.

TABLE 1

| Material | T_melting (° C.) | T_vaporization (° C.) |
|---|---|---|
| Cu | 1083 | 2562 |
| W | 3422 | 5555 |
| Mo | 2623 | 4639 |
| Graphite | 3650 | — |
| WC | 2870 | 6000 |
| $ZrO_2$ | 2715 | 4300 |
| SiC | 2730 | — |
| MgO | 2852 | 3600 |
| $Al_2O_3$ | 2072 | 2980 |

The refractory material(s) present in the refractory material reinforced copper composite may have one or more of the following structures: whiskers, continuous fibers, short fibers, particles, laminar flakes, and porous pre-form structures. If the refractory material(s) are fibers, the orientation of the fibers is preferably perpendicular to the inner surface of the contact tip, i.e. in a radial orientation.

The refractory material(s) of the refractory material reinforced copper composite in the contact tip 120 consumes a large amount of heat and/or remains in a solid state at the high welding temperatures to protect the matrix copper or copper alloy material of the contact tip from being burned off or adhered to the electrode welding wire. The refractory material(s) thereby reduce contact tip wear and extend the useful life of the contact tip 120. The solid state of the refractory material(s) also reduces feeding friction force between the contact tip and the electrode wire in the bore 130 by reducing the level of adherence of the electrode wire to the contact tip 120. Thus, the gap between the bore 130 of the contact tip 120 including the present refractory material(s) and the outer diameter of the electrode wire may be made tighter (smaller) than in conventional contact tips. For the same reason, the contact tip 120 is more tolerant of electrode wires having large deviations in outer diameter or large deviations in curvature (i.e., wire cast).

Figure 3:
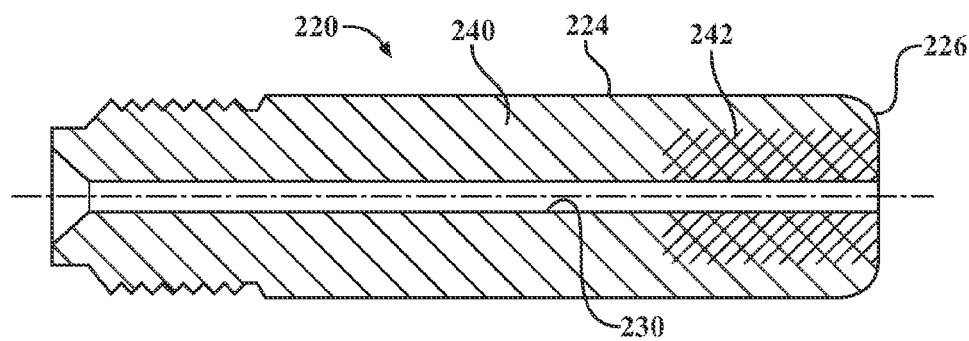
FIG. 3 is a sectional view of a contact tip including a refractory material reinforced copper composite in accordance with the present invention.

Optionally, as shown in FIG. 3, the body 224 of the contact tip 220 may be generally formed of a copper and/or copper alloy 240, and the refractory material reinforced copper composite 242 may be impregnated in the contact tip by casting, powder metallurgy, or similar. For example, the composite 242 may be disposed generally in the vicinity of the inner wall of the bore 230 at the front contact end 226 of the contact tip body 224. Welding current is transferred from the contact tip 220 to a consumable electrode wire in this location, and the composite 242 protects the contact tip 220 from arc erosion at the front end 226 of the tip. The specific content of refractory material(s) in the composite 224 may be uniform, or the content may be graded along axial length of the bore 230.

Figure 4:
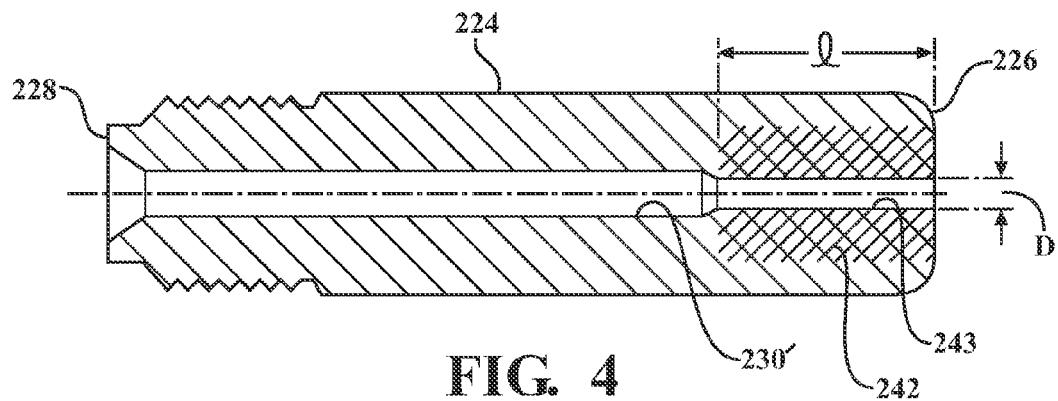
FIG. 4 is a sectional view of a contact tip including a refractory material reinforced copper composite in accordance with the present invention.

Further, as shown in FIG. 4, the central bore 230' in the body 224 that forms a passageway extending from the rear feed end 228 to the front discharge end 226 may have a portion 243 that is defined by the refractory material reinforced copper composite 242. The portion 243 has a diameter "D" that is approximately 3 to 8% larger than an outer diameter of a consumable electrode wire and a length "l" of approximately 0.2 to 0.6 inches. The following table (Table 2) provides examples of the dimensions of the bore portion 243 of a contact tip in accordance with the present invention, in relation to the diameters of consumable electrode wires used with the welding torch.

TABLE 2

| Diameter of wire | Diameter of bore portion | Length of bore portion |
|---|---|---|
| 0.030" (0.8 mm) | 0.0318 ± 0.0008" | 0.20 to 0.60" |
| 0.035" (0.9 mm) | 0.0368 ± 0.0008" | 0.20 to 0.60" |
| 0.039" (1.0 mm) | 0.0418 ± 0.0008" | 0.20 to 0.60" |
| 0.045" (1.14 mm) | 0.0478 ± 0.0008" | 0.20 to 0.60" |
| 3/64" (1.2 mm) | 0.0498 ± 0.0008" | 0.20 to 0.60" |
| 0.052" (1.3 mm) | 0.0553 ± 0.0008" | 0.20 to 0.60" |
| 1/16" (1.6 mm) | 0.0655 ± 0.0010" | 0.20 to 0.60" |

Figure 5:
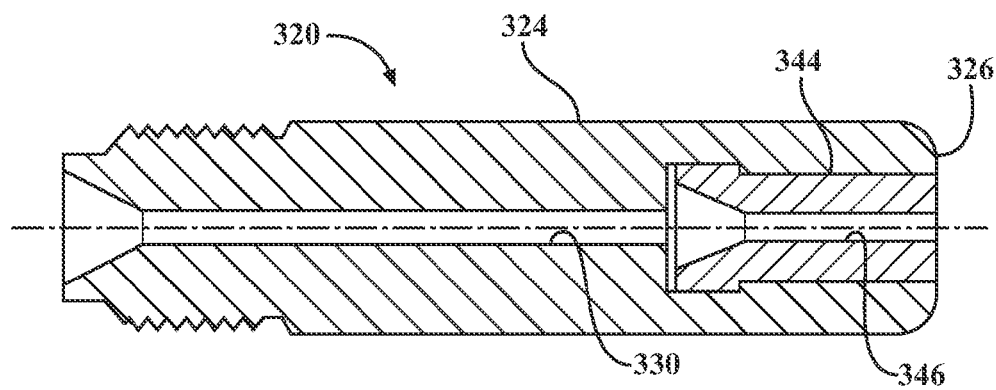
FIG. 5 is a sectional view of a contact tip including an insert made of a refractory material in accordance with the present invention.

Alternatively, as shown in FIG. 5, the body of the contact tip 320 may include an insert 344 received in the bore 330 through the front discharge end 326 of the body 324 and retained in the bore. The insert 344 is securely (non-detachably) mounted in the body 324 by threads, solder, crimping, press fitting, forging, or similar. The insert 344 is made of a refractory material reinforced copper composite in accordance with the present invention. The insert 344 includes an aperture 346 extending therethrough. The aperture 346 is generally aligned with the bore 330, and may have a diameter that is approximately 3 to 8% larger than the outer diameter of the electrode wire, and a length that is between 0.20 and 0.60 inches. The diameter of the rest of the bore 330 may be larger than that of the bore 346 for the sake of easy feeding of the electrode wire. The insert 344 is shown as having a length that is a fraction of the length of the body 324. However, the insert may have a length that is closer to the entire length of the bore.

Figure 6:
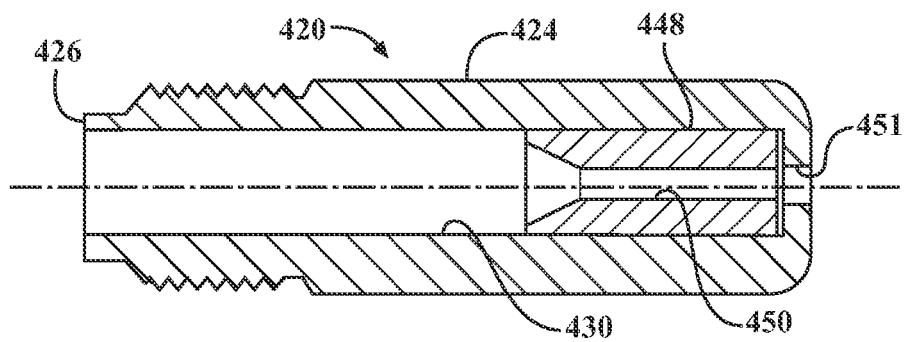
FIG. 6 is a sectional view of a contact tip including an insert made of a refractory material in accordance with the present invention.

Alternatively, as shown in FIG. 6, the body of the contact tip 420 may include an insert 448 received in the bore 430 through the rear feed end 426 of the body 424 and retained in the bore. The insert 448 is securely (non-detachably) mounted in the body 424 by threads, solder, crimping, press fitting, forging, or similar. The insert 448 is made of a refractory material reinforced copper composite in accordance with the present invention. The insert 448 includes an aperture 450 extending therethrough. The aperture 450 has a diameter that is approximately 3 to 8% larger than the outer diameter of the electrode wire, and a length that is between 0.20 and 0.60 inches.

Figure 7:
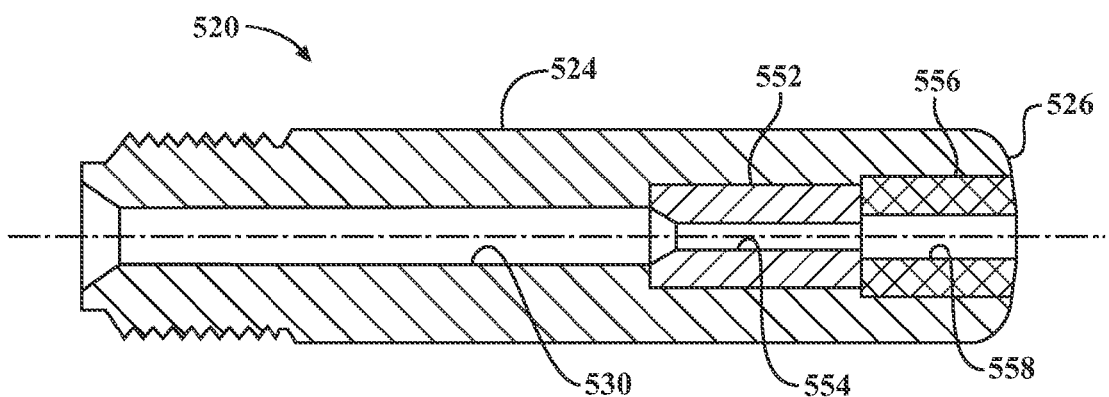
FIG. 7 is a sectional view of a contact tip including an insert made of a refractory material in accordance with the present invention.

Alternatively, as shown in FIG. 7, the body of the contact tip 520 may include a middle insert 552 retained in the bore 530. The middle insert 552 is made of a refractory material reinforced copper composite in accordance with the present invention, and includes an aperture 554 extending therethrough. The aperture 554 has a diameter that is approximately 3 to 8% larger than the outer diameter of the electrode wire, and a length that is between 0.20 and 0.60 inches. A front insert 556 is also received in the bore 530 through the front discharge end 526 and is disposed adjacent the middle insert 552. The front insert 556 includes an aperture 558 extending therethrough, and may be made of ceramic or a similar material. The apertures 554, 558 are generally aligned with the bore 530 (i.e., are coaxial with the bore). The diameters of the bore 558 and the bore 530 are generally larger than that of the bore 554. The inserts 552, 556 are securely (non-detachably) mounted in the body 524 by threads, solder, crimping, press fitting, forging, or similar.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A contact tip for a welding torch, the contact tip comprising:
   a refractory material reinforced copper composite including approximately 10 to 50% by volume of a refractory material and at least one of copper and a copper alloy;
   the refractory material being one of a metal and a ceramic material;
   the electrical conductivity of said refractory material reinforced copper composite being generally between $2.61 \times 10^7$ and $5.22 \times 10^7$ Siemens per meter at 20° C.

2. The contact tip of claim 1, wherein the refractory material comprises at least one of tungsten (W), molybdenum (Mo), graphite, tungsten carbide (WC), zirconium oxide ($ZrO_2$), silicone carbide (SiC), magnesium oxide (MgO), and alumina ($Al_2O_3$).

3. The contact tip of claim 1, wherein the refractory material has a structure including one or more of whiskers, continuous fibers, short fibers, particles, laminar flakes, and porous pre-form structures.

4. The contact tip of claim 1, wherein the refractory material is tungsten (W), and the refractory material is present in a range of 10 to 41% by volume.

5. The contact tip of claim 4, wherein the refractory material is present in a range of 10 to 32% by volume.

6. The contact tip of claim 1, wherein said contact tip is partially formed of said refractory material reinforced copper composite.

7. The contact tip of claim 1, wherein said contact tip is entirely formed of said refractory material reinforced copper composite.

8. The contact tip of claim 1, including a body made of at least one of a copper and a copper alloy, said body being impregnated with said refractory material reinforced copper composite.

9. The contact tip of claim 1, including a body having a front discharge end, an opposite rear feed end, and a bore extending through said body; and
   an insert received in said bore through one of said front discharge end and said rear feed end, said insert including said refractory material reinforced copper composite.

10. The contact tip of claim 1, including a body having a front discharge end, an opposite rear feed end, and a passageway extending from said rear feed end to said front discharge end;
    a portion of said passageway being defined by said refractory material reinforced copper composite, said portion having an inner diameter that is approximately 3 to 8% larger than an outer diameter of a consumable electrode wire, and said portion having a length of approximately 0.20 to 0.60 inches.

11. A contact tip for a welding torch, the contact tip comprising:
    a body having a front discharge end, an opposite rear feed end, and a passageway extending from said rear feed end to said front discharge end;
    a front portion of said passageway at said front discharge end having a diameter that is approximately 3 to 8% larger than an outer diameter of a consumable electrode wire, said front portion having a length of approximately 0.20 to 0.60 inches, and said front portion being defined by a refractory material reinforced copper composite;
    said refractory material reinforced copper composite including approximately 10 to 50% by volume of a refractory-material and at least one of copper and a copper alloy;
    the refractory material being one of a metal and a ceramic material;
    the electrical conductivity of said refractory material reinforced copper composite being generally between $2.61 \times 10^7$ and $5.22 \times 10^7$ Siemens per meter at 20° C.

12. The contact tip of claim 11, wherein the refractory material comprises at least one of tungsten (W), molybdenum (Mo), graphite, tungsten carbide (WC), zirconium oxide ($ZrO_2$), silicone carbide (SiC), magnesium oxide (MgO), and alumina ($Al_2O_3$).

13. The contact tip of claim 11, wherein the refractory material is tungsten (W), and the refractory material is present in a range of 10 to 41% by volume.

14. The contact tip of claim 13, wherein the refractory material is present in a range of 10 to 32% by volume.

15. A welding torch assembly comprising:
    a retaining head; and
    a contact tip mounted in said retaining head, said contact tip including a refractory material reinforced copper composite including approximately 10 to 50% by volume of a refractory material and at least one of copper and a copper alloy;
    the refractory material being one of a metal and a ceramic material;
    the electrical conductivity of said refractory material reinforced copper composite being generally between $2.61 \times 10^7$ and $5.22 \times 10^7$ Siemens per meter at 20° C.

16. The welding torch assembly of claim 15, wherein the refractory material comprises at least one of tungsten (W), molybdenum (Mo), graphite, tungsten carbide (WC), zirconium oxide ($ZrO_2$), silicone carbide (SiC), magnesium oxide (MgO), and alumina ($Al_2O_3$).

* * * * *